Figure 1:
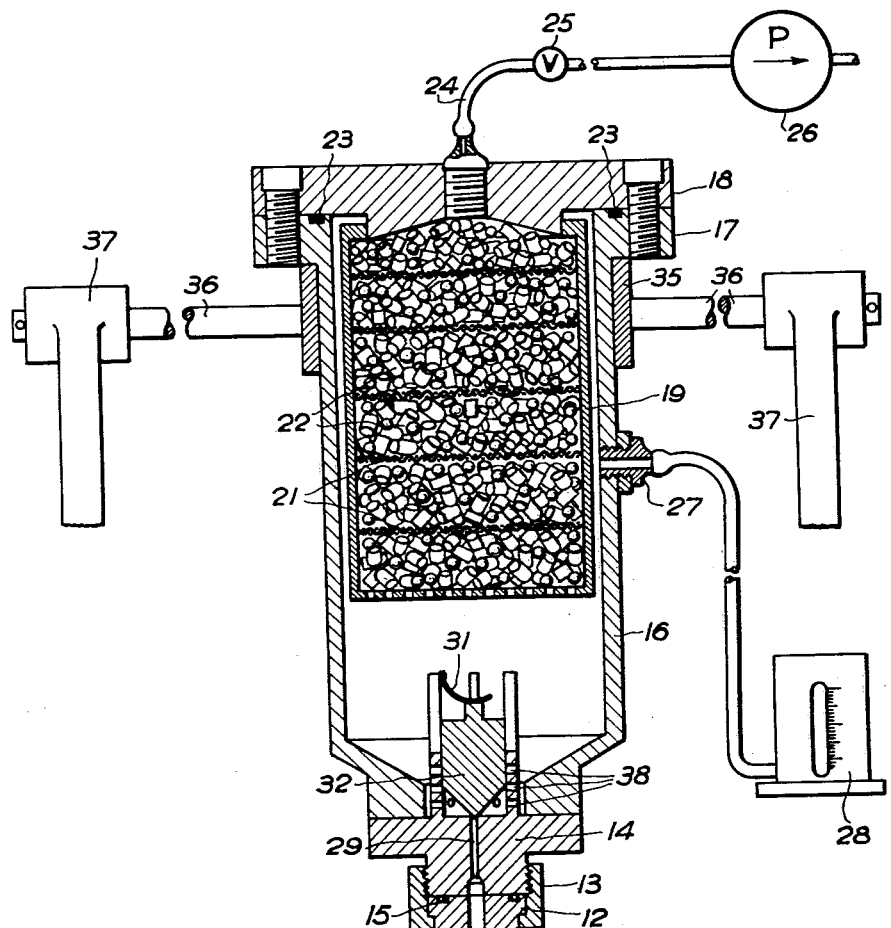

Aug. 15, 1961   D. FIRTH ET AL   2,995,922
GASES AND VAPOUR MEASURING APPARATUS
Filed Jan. 16, 1958

Inventors:
Donald Firth
James Kane
By: Stevens, Davis, Miller & Mosher
Attorneys United States Patent Office
2,995,922
Patented Aug. 15, 1961

2,995,922
GASES AND VAPOUR MEASURING APPARATUS
Donald Firth and James Kane, both % Mechanical Engineering Research Laboratory, East Kilbride, Glasgow, Scotland
Filed Jan. 16, 1958, Ser. No. 709,237
Claims priority, application Great Britain Jan. 18, 1957
10 Claims. (Cl. 73—53)

This invention relates to the measurement of air or other gas entrained in liquids, for instance, the oil used in lubrication, fuel, or hydraulic systems, and to the measurement of vapour pressures.

Apparatus according to the invention comprises a container for liquid to be tested, a vessel which can be put into communication with the container, a filling in the vessel of discrete pieces of solid material, means operable from outside the vessel without establishing communication with the surrounding air for opening communication between the vessel and container with the container uppermost and inverted and also for closing communication between the vessel and container, means for establishing communication between the inside of the vessel and a manometer, and means for establishing communication between the inside of the vessel and an evacuating pump.

The means for establishing and closing communication between the vessel and the container may be a valve held closed by gravity when the container is below the vessel and opened by gravity when the apparatus is inverted. The liquid can then run into the vessel by gravity.

In use for the measurement of entrained air or other gas the container is charged with a sample of the liquid and secured to the vessel, the whole being hermetically closed except for connections to the manometer and the vacuum pump. The vessel is evacuated to a convenient value, indicated by the manometer. The connection to the vacuum pump is then closed. The vessel and container are brought into a position with the container uppermost and the communication between the two opened. Thereupon the liquid is discharged over the filling, so that it is spread in a thin layer over a large area and at the same time it is suddenly exposed to a drop in pressure. This causes entrained air to be given off very rapidly and in a short time the manometer gives a new, steady indication. From the dimensions of the parts, the manometer readings and the size of the sample, the air entrained in the sample can readily be calculated.

It can readily be shown that if the vapour pressure of the liquid is low enough to be ignored, the volume of released air at normal temperature and pressure is equal to $(P_2-P_1)Vc/RT\rho$, where $P_1$ is evacuated pressure in the vessel, $P_2$ is the pressure in the vessel after release of air, $Vc$ is the free volume of the vessel, $R$ is the gas constant, $T$ is the temperature at which the measurement is made and $\rho$ is the density of air at normal temperature and pressure.

If the vapour pressure of the liquid at the temperature at which the measurement is effective is appreciable and is known or can be calculated, it can be allowed for simply by subtracting its value from the differential pressure $(P_2-P_1)$ before making the above calculation.

The apparatus can also be used for measuring vapour pressure. In that case a sample of the liquid to be tested is introduced into the apparatus in the same way as above described and thereby degassed. The degassed liquid is then taken out and bottled securely. The apparatus is now cleaned out and the degassed liquid introduced into the sample bottle, the system evacuated and isolated, the apparatus inverted and the pressure then read as above described, the reading now giving the vapour pressure. By heating the apparatus and measuring the vapour pressure the relationship between temperature and vapour pressure can be ascertained.

Figure 2:
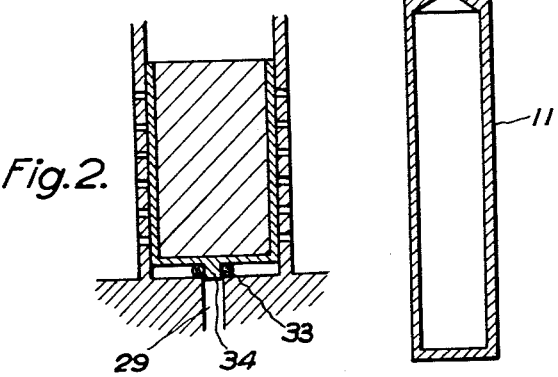

By way of example a convenient embodiment of the invention will now be described with reference to the accompanying drawings, in which FIGURE 1 is a vertical section and FIGURE 2 is a detail of a modification of part of the apparatus.

In the construction illustrated, the container for the sample is a metal bottle 11 with a flange 12 whereby it can be held by a union nut 13 to a valve guide body 14. An O ring 15 between the abutting faces makes a good joint. The valve guide body is secured fluid tight in the lower end of a metal vessel 16 of cylindrical form, the upper end of which is flanged at 17 to receive a closing plate 18 bolted on and carrying a depending hollow inner vessel 19 with perforated walls and perforated, e.g. wire mesh, screens 21. This inner vessel is filled, for instance, with steel balls and rollers 22 such as are used in bearings or with hollow cylinders of porcelain or with the small bodies commonly used in distillation columns. The filling is separated into layers by the screens 21. An O ring 23 provides a seal between the plate 18 and flange 17 on the vessel 16. Through the plate 18 is a connection 24 leading through a valve 25 to a vacuum pump 26 and to the side of the main vessel about half-way up is a connection 27 to a manometer 28.

There is a small bore 29 through the valve guide body 14 and this is normally closed by a sliding valve member closed by its own weight.

In FIGURE 1 this valve member is a cone 32 backed by a cylinder to give it sufficient weight while in FIGURE 2 the valve proper is constituted by an O ring 33 seated on a spigot 34 which is small enough in diameter to enter the bore 29, again backed by a cylinder to give it weight. The weight of the valve may be increased by making the cylinder thin walled with a filling. In either case the valve guide body may have its upper end cut away to form guide bars of sufficient length to guide the valve member when it is open and some form of stop is provided to prevent the valve member from falling out when the vessel is inverted. Such stop may take the form of a spring 31 which will add to the closing pressure, but it must not be strong enough to prevent the valve from opening under its own weight when the vessel is inverted.

The vessel 16 is mounted for example by a clamping collar 35 with trunnions 36, journalled in a frame 37 so that the vessel can be conveniently inverted about a horizontal diametral axis at a suitable position on its length. The connections to the pump 26 and manometer 28 are flexible to allow for this inversion. When the vessel is inverted the valve opens under its own weight allowing the contents of the container 11 to flow through the bore 29 and holes 38 in the wall of the guide body 14 within the vessel 16 and thence through the wall of the inner vessel 19 and over the filling.

In testing synthetic liquids such as silicones and non-flam hydraulic fluids and oils a convenient value of pressure down to which the vessel 16 may be evacuated would be 0.01 to 0.05 mm. of mercury. A convenient size of apparatus employs a sample of, say, 4 or 5 cubic inches of oil.

What we claim is:

1. Apparatus for use in the measurement of gases entrained in liquids or for the measurement of vapour pressures of liquids comprising a container for liquid to be tested, a closed vessel, means for sealingly securing the container and vessel together in end to end relationship and having a passage therethrough for connecting the inside of the container with the inside of the vessel, the assembly of the vessel and container being convertible to bring either the vessel or the container uppermost, a valve controlling said passage and so disposed as to open under the force of gravity when the vessel is uppermost and to move to the closed position when the container is uppermost without communication being established between the inside of the container and vessel and the ambient atmosphere, a filling in the vessel of discrete pieces of solid material, means for establishing communication between the inside of the vessel and a manometer, and means for establishing communication between the inside of the vessel and an evacuating pump.

2. Apparatus as set forth in claim 1 wherein said valve is weighted and its weight alone serves to close it when the vessel is in its uppermost position.

3. Apparatus as set forth in claim 1 also including a spring urging said valve towards its closed position, the spring not being strong enough to prevent the valve opening under gravity when the container is in its uppermost inverted position.

4. Apparatus as set forth in claim 1 wherein said valve is a cone valve.

5. Apparatus as set forth in claim 1 wherein said valve comprises a spigot of small enough diameter to enter the communicating passage between the container and vessel and an O ring on said spigot.

6. Apparatus as set forth in claim 1 also including trunnions upon which the vessel is supported on a horizontal axis upon which it can be inverted.

7. Apparatus as set forth in claim 1 wherein said vessel includes a removable closure at the end of the vessel remote from the container, the apparatus also including a perforated inner vessel carried by said closure, said filling being held in said inner vessel.

8. Apparatus as set forth in claim 7 wherein said inner vessel also holds a plurality of perforated screens separating said filling into a plurality of layers.

9. Apparatus for use in the measurement of gases entrained in liquids or for measurement of vapour pressure of liquids comprising a cylindrical main vessel, a valve guide body secured fluid tight in the lower end of the said vessel having a narrow passage through it, a removable sample bottle secured fluid tight to said valve body with the passage in communication with the interior of the bottle, a gravity valve co-operating with said passage to close it when the vessel is supported with said bottle below it, a closure plate secured fluid tight to the upper end of said vessel, a perforated walled inner vessel depending from said closure plate, a filling of small solid bodies in said inner vessel, a valved connection through said closure plate for connection to an evacuating pump, a connection fitting opening through the side of said vessel for connection to a manometer, and trunnion means supporting said vessel rotatably on a horizontal axis whereby it can be inverted to bring said bottle into an uppermost inverted position and to open said gravity valve to enable the contents of said bottle to flow into said vessel and over said filling.

10. Apparatus as set forth in claim 9 wherein said sample bottle is secured by means of a screw thread on said guide body and a union nut screwing on to said thread and pressing said bottle against the end of said body.

References Cited in the file of this patent

UNITED STATES PATENTS

| | | |
|---|---|---|
| 1,318,362 | Davis | Oct. 14, 1919 |
| 2,473,765 | Platts | June 21, 1949 |

FOREIGN PATENTS

| | | |
|---|---|---|
| 761,870 | Great Britain | Nov. 21, 1956 |